United States Patent [19]
Lutkus et al.

[11] Patent Number: 6,019,567
[45] Date of Patent: Feb. 1, 2000

[54] SLIDABLE LOAD LIFTING SYSTEM

[75] Inventors: Gerald A. Lutkus, Bainbridge Township; Ronald K. Farleman, Reminderville, both of Ohio

[73] Assignee: Lift Technologies, Inc., Oakwood Village, Ohio

[21] Appl. No.: 09/046,349

[22] Filed: Mar. 23, 1998

[51] Int. Cl.$^7$ ..................................... B60P 1/00
[52] U.S. Cl. ................... 414/549; 414/522; 414/501; 414/914; 414/556; 414/542
[58] Field of Search ................... 414/522, 501, 414/540, 541, 542, 545, 546, 549, 921, 917, 544, 610, 660, 662–4, 556; 187/233; 280/166

[56] References Cited

U.S. PATENT DOCUMENTS

| | | | |
|---|---|---|---|
| 2,823,813 | 2/1958 | Shimmon | 414/541 |
| 3,842,997 | 10/1974 | Sprikkelman | 214/77 |
| 4,005,788 | 2/1977 | Ratliff | 214/77 |
| 4,252,491 | 2/1981 | Hock | 414/540 |
| 4,325,666 | 4/1982 | Chain et al. | 414/501 |
| 4,425,071 | 1/1984 | Dunbar | 280/166 |
| 4,671,730 | 6/1987 | Gateau | 414/541 |
| 4,729,712 | 3/1988 | Corley, Jr. | 414/557 |
| 4,778,328 | 10/1988 | Apgar | 414/541 |
| 4,787,809 | 11/1988 | Zrostlik | 414/557 |
| 5,110,252 | 5/1992 | Aoki | 414/917 |
| 5,209,629 | 5/1993 | Rasmussen | 414/783 |
| 5,244,334 | 9/1993 | Akita et al. | 414/917 |
| 5,556,250 | 9/1996 | Fretwell et al. | 414/917 |
| 5,618,150 | 4/1997 | Poindexter | 414/522 |
| 5,829,945 | 11/1998 | Stanley | 414/522 |

OTHER PUBLICATIONS

Anthony Lift Gates, Inc., "Little Anthony Direct–Drive Hydraulic Liftgates for Pickup Trucks and Service Bodies" brochure.

Primary Examiner—David A. Bucci
Assistant Examiner—Isobel A. Parker
Attorney, Agent, or Firm—Fay, Sharpe, Fagan, Minnich & McKee, LLP

[57] ABSTRACT

A slidable load lift apparatus is selectively completely retractable into the bed of a standard pickup truck. The load lift apparatus includes a base frame member attached to the pickup truck bed, the base frame member supporting a substantially planar roller platform member slidably engaged with the base frame member. The base frame member includes a pair of elongate rail members extending in parallel along a first longitudinal axis and adapted to engage a set of roller wheels provided on the bottom of the roller platform member. A substantially planar lift platform member is operatively connected to the roller platform member through a set of parallelogram linkages which permit the lift platform to be moved between a raised position coplanar with the roller platform member and a lowered position out of the plane of the roller member for convenient loading of the lift platform at ground level. In the raised coplanar orientation between the lift platform member and the roller platform member, the platform member pair are slidable together relative to the base frame member. A locking arrangement is provided to prevent the inadvertent sliding of the roller platform member relative to the base frame member when the pickup truck vehicle supporting the load lift apparatus is in motion.

24 Claims, 9 Drawing Sheets

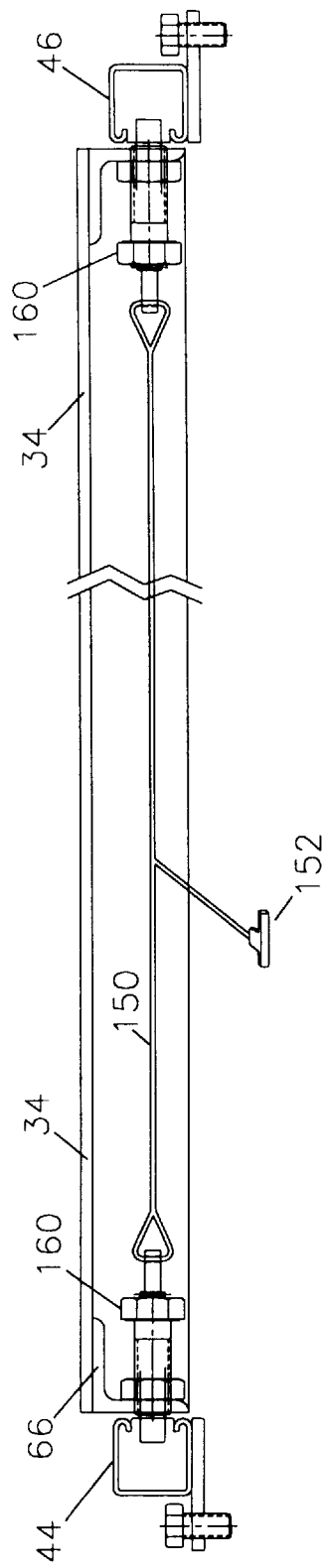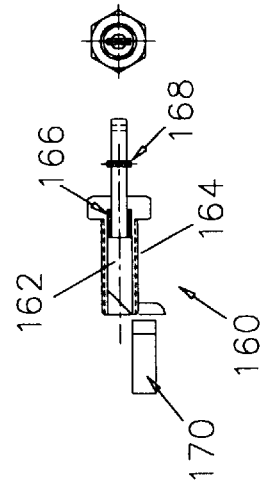
FIG. 6a
FIG. 6c
FIG. 6b

SLIDABLE LOAD LIFTING SYSTEM

BACKGROUND OF THE INVENTION

The subject invention is directed to the art of load lifting devices and, more particularly, to a load lifting system adapted for slidable mounting to the bed of a standard pickup truck vehicle for retraction of the entire system into the truck bed. Although the present invention will be described with particular reference to pickup truck and van vehicles, it is to be appreciated that the subject invention has other uses and is equally adapted for use with any vehicle having a flatbed or in other non-vehicle related applications such as, for example, loading docks, fixed support platforms, or the like.

Presently, there are many load lifting devices available on the market that are adapted for mounting to the rear of large delivery trucks, pickup trucks, or other vehicles of the type having a rear cargo deck portion provided for carrying various types of loads. One such system is shown in FIG. 1 whereat a lift gate assembly 10 is illustrated having a generally U-shaped base member 12 connected to a planar lift gate 14 by means of a pair of spaced apart, parallelogram linkages 16, 18. One or more prime movers such as electric motors or hydraulic cylinders 20, 22 as shown, are pivotally connected between the parallelogram linkages 16, 18 at selected fixed mounting locations on the U-shaped base member 12. As the hydraulic cylinders linearly extend when they are actuated, the parallelogram linkages 16, 18 provide for relative vertical movement between the lift gate 14 and the U-shaped base member 12 while simultaneously maintaining the lift gate 14 in a horizontal orientation substantially as shown. In that way, the lift gate 14 is movable between a range of vertical load and unload positions relative to the U-shaped base member 12. The parallelogram linkage mechanism is well known in the art.

Although lift gate devices such as the example illustrated in FIG. 1 have met with some success, one major drawback associated with apparatus of that type configuration is the manner in which they are attached to the rear of target vehicle. More particularly, prior art lift gate assemblies are attached directly to the frame of the target vehicle such as, for example, by bolting or welding the assembly to structural frame members. This being the case, the lift gate assemblies of the prior art remain fixed to the outside of the vehicle during use and, therefore, are exposed to the elements such as snow, rain, dirt, and the like.

Another disadvantage of the prior art lift gate assemblies mounted outside of the vehicle body is that once mounted to the target vehicle frame, they interfere with the use of hitches, winches, step bumpers, or other items normally associated and useful on the rear of truck-type vehicles.

In addition to the above, typical prior lift gate assemblies require modification to the target vehicle such as, for example, the removal of the rear bumper and tailgate in pickup trucks. Since the tailgate provides some security to the contents contained within the pickup truck bed, the removal of same could cause serious security issues with respect to loads that are likely to be stolen from the pickup truck bed.

Further with regard to the required modification to the target vehicle, typical prior art lift gate assemblies include a platform portion that is normally folded up into a vertical orientation when the lift device is not in use or while the vehicle is in motion. In addition to the negative aesthetic aspects of the pickup truck looking unlike a regular vehicle on the road, the position of the lift gate, together with the location of the U-shaped base member, causes interference with the use of truck caps or other pickup bed protective devices including soft protective covers and rigid bed lid devices or the like.

The inability to use a truck cap coupled with the requirement of tailgate removal poses a potentially serious security risk to the cargo loaded in the pickup truck bed. There is little that can be done to protect against theft of the cargo when the vehicle is left unattended.

Lastly, prior art lift gate assemblies such as the example illustrated in FIG. 1 require secondary handling of the load between a position on the lift gate 14 and the storage and transport location within the pickup truck bed. In that regard, the cargo must be pushed, skidded, or dragged into the vehicle from the lift gate prior to folding the lift gate into its locked, vertical orientation for transport of the cargo in the pickup truck bed.

It would be desirable to provide a load lifting system that is adapted to be selectively totally self-contained within the bed of a typical pickup truck so that tailgates and caps could be used. Further, it would be desirable that the load lifting system be slidable on a frame member for horizontal translatory motion relative to the plane defined by the pickup truck bed.

It would further be desirable to provide a load lifting system that is not only slidable so as to be self-contained within the pickup truck bed, but also to provide a load lifting system that enables the use of pickup truck caps, tailgates, and bumpers, hitches, and the like in order that the cargo may be protected against theft and against potentially harmful environmental conditions and, further, to give the vehicle a "regular" outward appearance.

SUMMARY OF THE INVENTION

In accordance with a first preferred embodiment of the present invention, a new and improved slidable load lift system is provided. The subject load lift-system includes a base frame member adapted for connection to the bed of a standard pickup truck. The base frame member includes a pair of elongate rail members extending in parallel along a first longitudinal axis. A substantially planar roller platform is engaged with the base frame member and is slidable in a first plane along said first longitudinal axis. The roller platform and the base frame member define a set of cooperating engagement elements to provide for relative slidable movement between the roller platform member and the base frame member. A planar lift platform member is operatively connected to the roller platform member and, accordingly, is selectively slidable therewith in the first longitudinal axis. The lift platform member is movable between a first lowered position spaced apart from the roller platform member, and a second raised position adjacent the roller platform member and in the first plane. In the first position, the planar lift platform is adapted for loading and unloading cargo between the ground and the lift platform. In the second position, the lift platform member is adapted for movement of a load between the lift platform member and the roller platform member in the first plane. At least one linear actuator member is pivotally connected on one end to the base frame member and on the other end to the lift platform member for selectively causing relative movement between the roller platform member and the lift platform member between said first lowered position and said second raised position.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIGS. 6a–c are illustrations of an alternative locking pin arrangement used in the load lifting system of FIGS. 2–4;

DETAILED DESCRIPTION OF THE PREFERRED EMBODIMENTS

Figure 1:
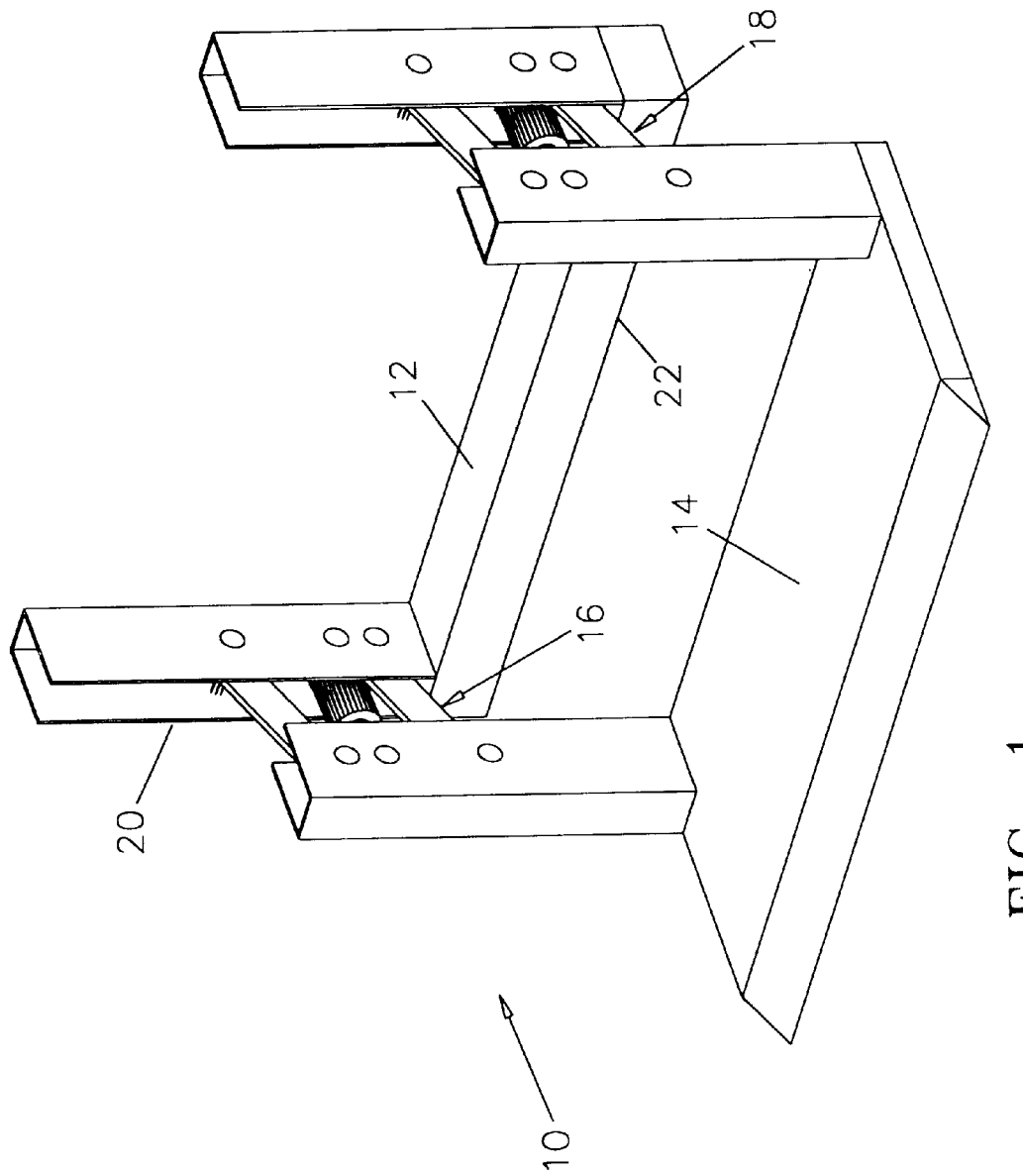
FIG. 1 is a perspective view of a prior art lift gate assembly.

Referring now to the drawings wherein the showings are for the purposes of illustrating the preferred embodiments of the invention only and not for purposes of limiting same, FIGS. 2–5 illustrate the slidable load lifting system 30 formed in accordance with the first preferred embodiment of the present invention. For reasons that will subsequently become apparent, the first preferred embodiment is especially well suited for use with stake bed trucks, vans, loading docks, and pickup trucks equipped with a full cap covering the rear of the truck bed and replacing the standard tailgate.

Generally, the major components of the load lifting system 30 according to the first embodiment include a base frame member 32 adapted for attachment to a pickup truck bed, a roller platform member 34 slidably engaged with the base frame member 32, a lift platform member 36 connected to the roller platform member 34 by a parallelogram linkage system 38, and a pair of linear actuators 40, 42.

The base frame member 32 is preferably formed by a pair of elongate rail members 44, 46 extending substantially in parallel as illustrated and along a longitudinal axis L. When the load lifting system 30 is used in conjunction with a pickup truck bed, the longitudinal axis L extends between the front and rear of the vehicle. The pair of elongate rail members 44, 46 are affixed to the truck bed using suitable fasteners such as a set of bolts 48 extending through holes provided in a corresponding set of mounting plates 50 which are, in turn, welded to the bottom of the pair of elongate rail members 44, 46 at spaced apart locations.

Preferably, each of the rail members 44, 46 are elongate channel stock members having a "C" shaped cross section defining a smooth profile that is substantially uniform over their entire length. As shown, the rail members are oriented so that the open sides of the "C" shaped cross section face inwardly toward each other and toward the longitudinal axis L. The set of mounting plates 50 are welded to the bottom sides of the "C" shaped rail members. The top and vertical outer sides of the "C" shaped rail members protect the track surface formed by the rail members from interference that may be caused by loose extraneous objects stored in the pickup bed and, also, provide a groove enclosed on three sides for slidably capturing wheels extending from the roller platform therein. A set of end cap plates 52 (FIG. 4) are provided on the four open ends of the "C" shaped rail members 44, 46 as shown to prevent the roller platform member 34 from inadvertently sliding out from engagement with the base frame member 32.

Figure 5:
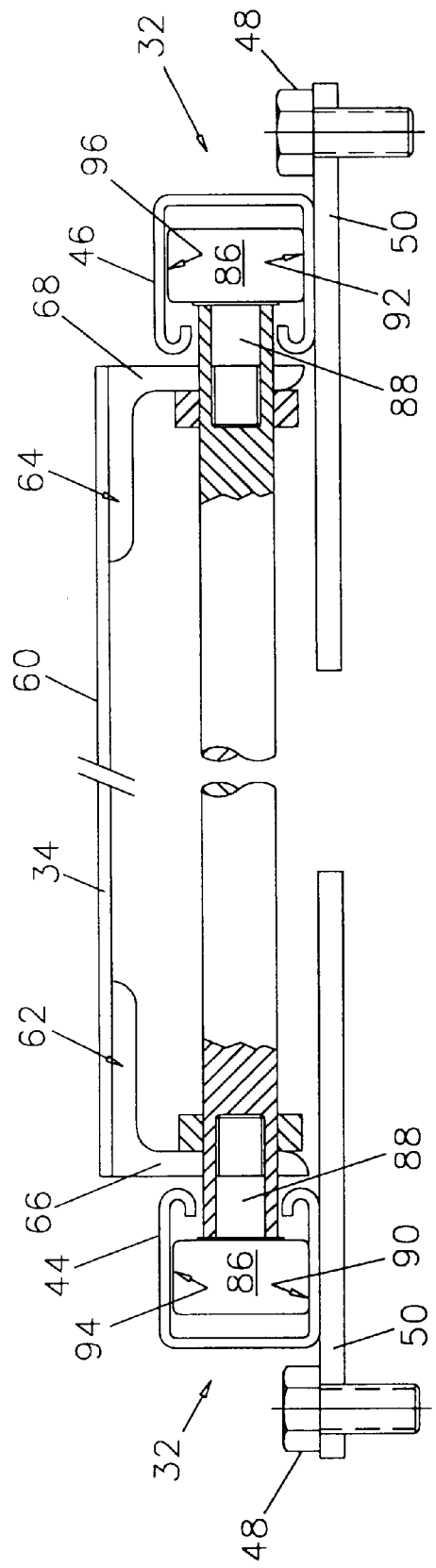
FIG. 5 is a cross-sectional view of the subject load lifting system taken through line 5—5 of FIG. 2.

As best shown in FIG. 5, the roller platform member 34 includes a substantially planar central section 60 supported from beneath by at least a pair of spaced apart reinforcement rib members 62, 64 extending in parallel along the longitudinal axis L as shown. The pair of spaced apart reinforcement rib members are preferably elongate angle stock having a flat top side portion welded to the bottom side surface of the roller platform member 34 and a downwardly extending flat side portion forming a pair of elongate lip panels 66, 68 on opposite sides of the roller platform member 34.

Figure 2:
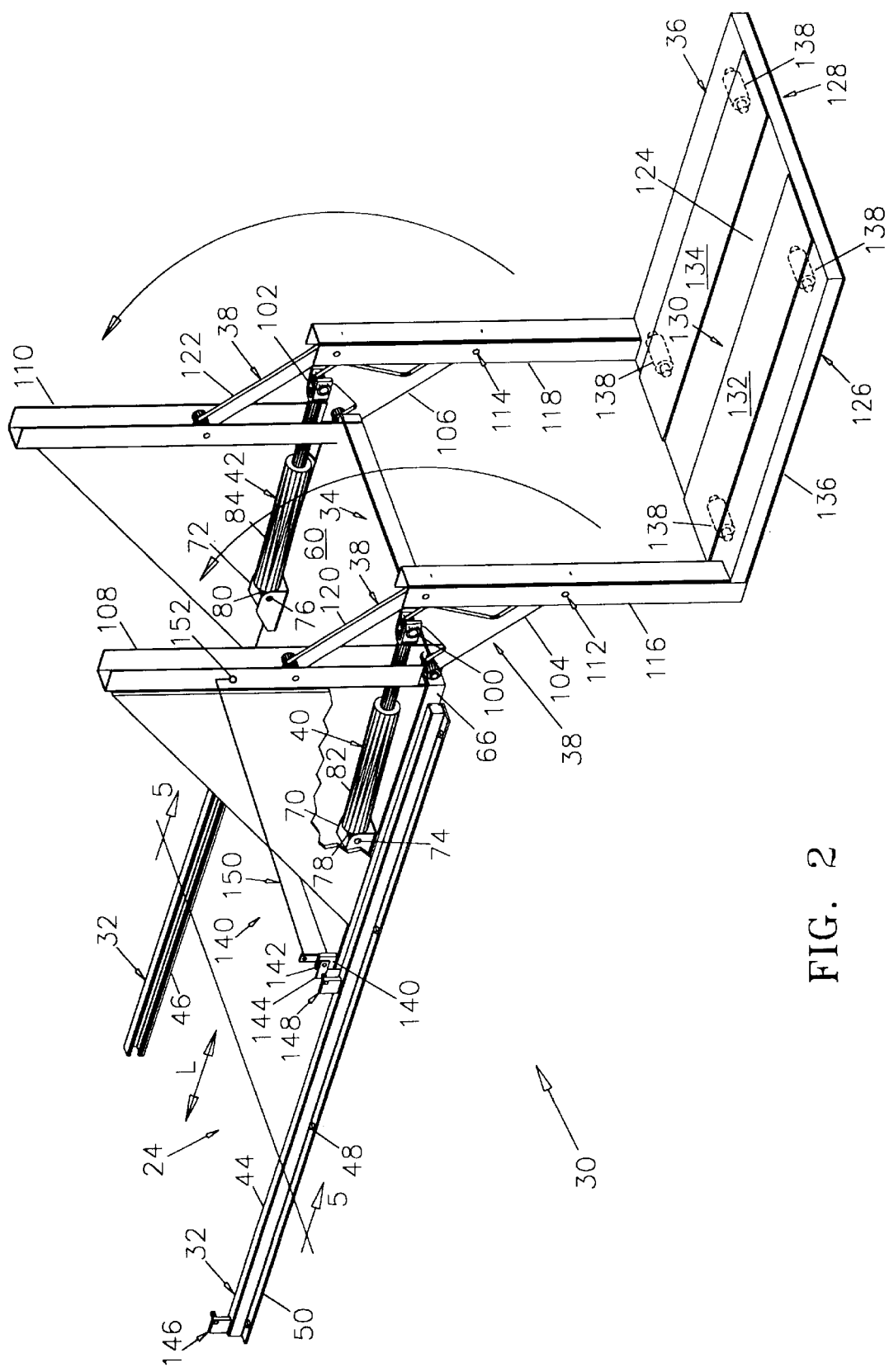
FIG. 2 is a perspective view of a slidable load lifting system in accordance with a first preferred embodiment of the present invention shown in its fully extended and lowered position.
Figure 3:
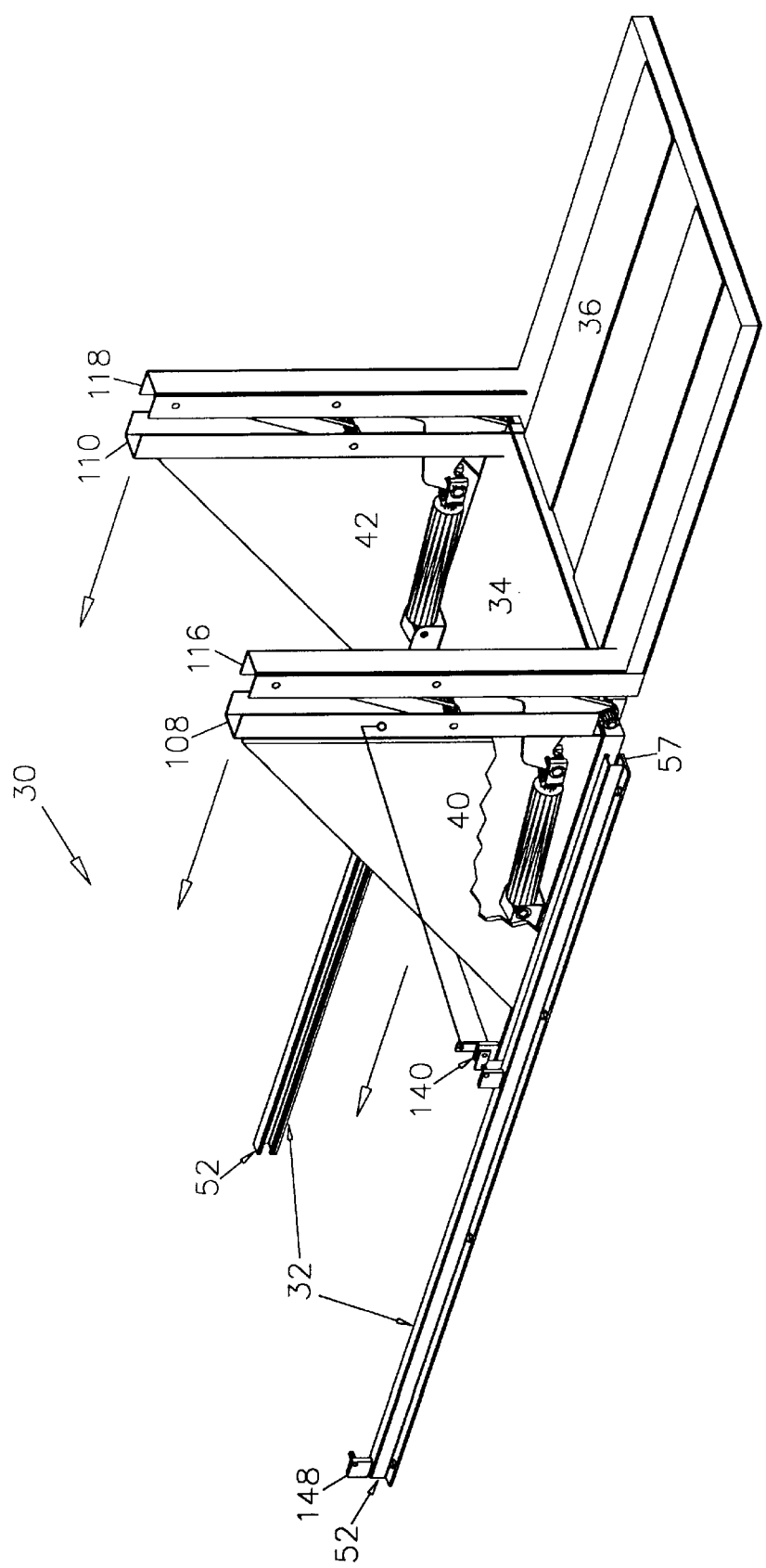
FIG. 3 is a perspective view of the system of FIG. 2 shown in its fully extended and raised position.
Figure 4:
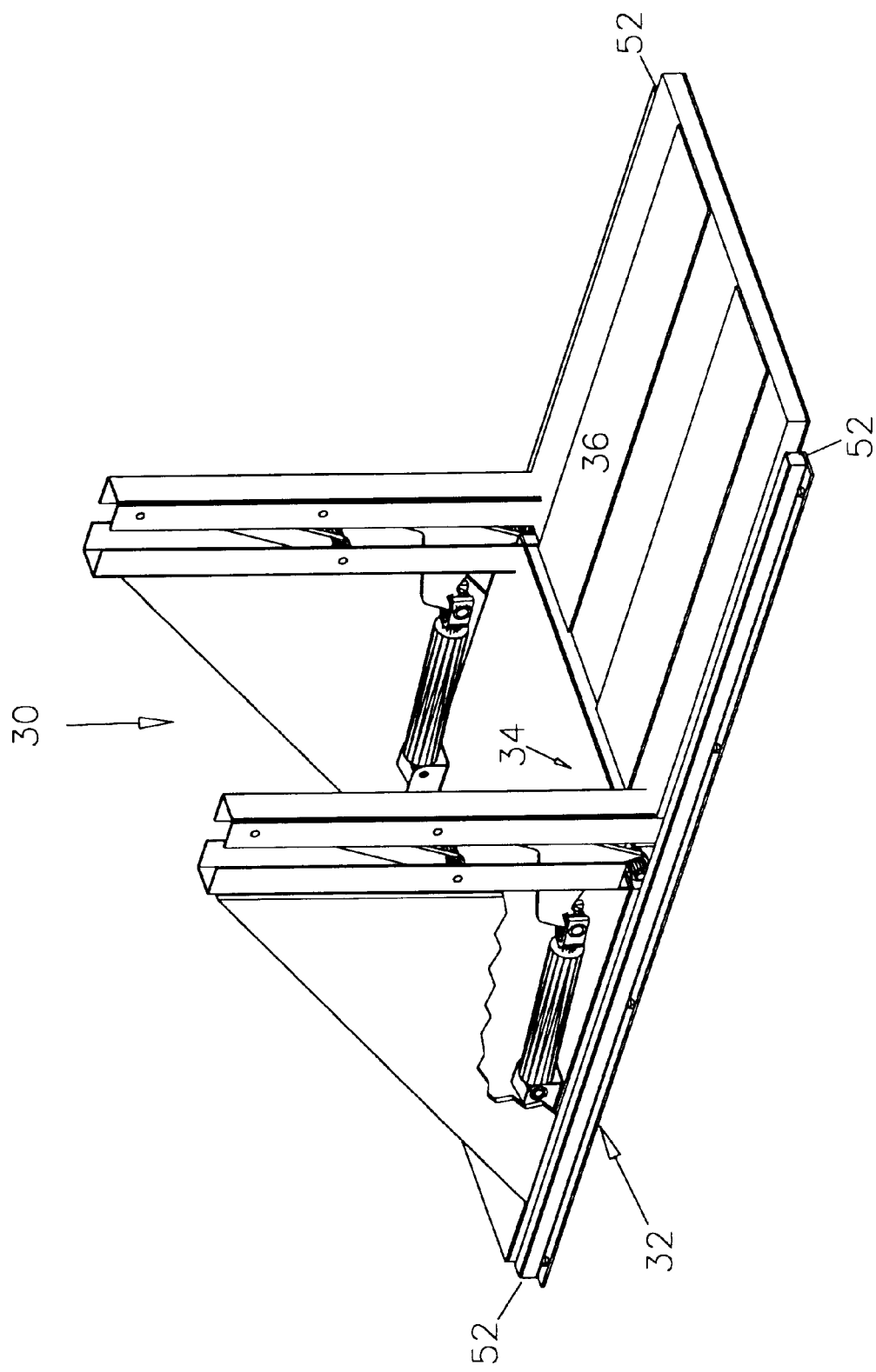
FIG. 4 is a perspective view of the load lifting system of FIGS. 2 and 3 shown in its fully retracted position.

As shown in FIGS. 2, 3, and 4, a pair of linear actuator support brackets 70, 72 are attached to the pair of elongate lip panels 66, 68 near the center of the roller platform member 34 as shown. The pair of support brackets 70, 72 are preferably attached to the pair of rib members 62, 64, by a fastening means such as, for example, a nut and bolt connection to facilitate easy replacement of brackets that may become broken during use, but other attachment means can be used as well such as welding. A pair of outwardly extending pivot pins 74, 76 are provided near the top ends of the support brackets 70, 72. The pins are adapted to engage the stationary pivotal ends 78, 80 of the pair of linear actuators 40, 42. In the preferred embodiments of the present invention, the pair of linear actuators comprise a pair of hydraulic cylinders 82, 84 which are connected in parallel using suitable high pressure hydraulic lines connected to a pressurized source of fluid (not shown) in a manner well known in the art. The operation of the hydraulic cylinders 82, 84 in relation to the subject invention will be subsequently described below.

So that the roller platform member 34 is slidable relative to the base frame member 32, a set of roller wheels 86 are provided on a corresponding set of axle members 88 extending outwardly from the pair of elongate lip panels 66, 68 as shown in FIG. 5. Preferably, four roller wheels 86 are provided on the roller platform member and arranged in a manner thereon so as to provide support in each of the four corners of the planar central section 60. In that way, a load supported by the planar central section is evenly supported and its weight is thereby evenly distributed over the roller platform member 34. Although roller wheels are preferred, other engagement mechanisms could be used as well such as, for example, low friction slides, lubricated ways, or the like.

The set of roller wheels 86 are preferably disposed in rolling engagement with the pair of elongate rail members 44, 46 and captured therebetween from above, below, and on the outside by the "C" shape of the rail members as shown. The "C" shaped rail members 44, 46 define a pair of bottom track surfaces 90, 92 and a corresponding set of opposed top track surfaces 94, 96. The set of roller wheels 86 are rotatably supported by the corresponding set of axle members 88 and extend outwardly from the left and right edges of the roller platform member 34 so as to interlock the roller platform assembly between the pair of bottom track surfaces 90, 92 and the pair of top track surfaces 94, 96. In that way, the roller platform member is slidably supported by the base frame member 32 in a manner as to prevent tipping of the roller platform member as it is rolled between extended and retracted positions whenever there is an offset between the cargo weight supported by the lift platform member 36 and the cargo weight supported by the roller platform member 34 in favor of the former.

Turning once again to FIGS. 2–4, the linearly movable ends 100, 102 of the pair of hydraulic cylinders 82, 84 are pivotally connected to a first end of a corresponding pair of crank arm members 104, 106 as shown. The crank arm members 104, 106 are supported for pivotal rotation by a corresponding pair of spaced apart vertically oriented support frame members 108, 110 which are fixedly attached at their lower ends to the roller platform member 34 as shown. The second ends 112, 114 of the pair of crank arm members 104, 106 are, in turn, pivotally connected to a pair of spaced apart, vertically oriented lift platform frame members 116, 118 so that movement of the linearly movable ends 100, 102 of the pair of hydraulic cylinders 82, 84 causes relative movement between the lift platform member 36 and the roller platform member 34 in a well known manner.

The second ends 112, 114 of the crank arm members 104, 106, together with a pair of idler arm members 120, 122 form the parallelogram linkage system 38 for connecting the lift platform member 36 to the roller platform member 34. As understood by those skilled in the art, the parallelogram linkage system 38 enables vertical movement of the lift platform member 36 relative to the roller platform member 34 between the raised position illustrated in FIG. 3 and the lowered position illustrated in FIG. 2, and through a continuous range of positions therebetween. The details of the parallelogram linkage system 38 and the operation thereof are well known in the art and therefore, will not be described with any more particularity herein.

The lift platform member 36 includes a rectangular substantially planar central section 124 supported from below by a pair of longitudinal support brackets 126, 128. The support brackets are rigidly attached at right angles to the pair of support frame members 108, 110 so that as the parallelogram linkage system 38 effects translatory motion to the support frame members 108, 110, the lift platform member 36 moves relative to the roller platform member 34 in a manner well known in the art. Preferably, the top surface 130 of the planar central section 124 is provided with a pair of spaced apart low friction interface devices 132, 134 as shown. In the preferred embodiment illustrated, the low friction interface devices 132, 134 are one-fourth inch thick ultra-high molecular weight (UHMW) panels affixed to the top surface 130 of the lift platform member 36 to assist in sliding operatively associated load items from the lift platform member 36 onto the roller platform member 34 when the former is in the raised position illustrated in FIG. 3.

In order to assist in the slidable motion between the roller and lift platform members 34, 36 relative to the base frame member 32, the bottom surface 136 of the planar central section 124 is provided with a set of roller wheels 138 arranged thereon substantially as shown. The roller wheels are adapted to engage the planar top surface 24 of the associated pickup bed onto which the base frame member 32 is attached. Although in the preferred embodiment a set of four wheels are used, the four wheels being disposed in the corresponding set of four corners formed by the planar central section 124, other quantities and arrangements of support roller wheels or skid type slidable devices could equally well be used.

FIG. 2 illustrates the subject load lifting system 30 in its fully extended position with the lift platform member 36 being in a lowered position. FIG. 3 illustrates the subject load lifting system 30 in its fully extended position with the lift platform member 36 being disposed in a raised position. Lastly, FIG. 4 illustrates the subject load lifting system 30 in its fully retracted position. As shown there, both the lift platform member 36 and the roller platform member 34 are disposed within a perimeter defined generally by the base frame member 32. More particularly, both the roller platform member and the lift platform member are located within a boundary in the plane of the base frame member defined by a projection of the base frame member on that plane. In that way, the entire load lifting system 30 can be contained completely within the bed of a pickup truck. This facilitates enclosing the load lifting system 30, together with any cargo that may be supported thereon within the pickup truck bed with the tailgate closed.

In order to prevent inadvertent relative slidable motion between the roller platform member 34 and the base frame member 32, a manual latching assembly 140 is provided as shown. A bracket 142 connected to the left elongate lift panel 66 pivotally supports a latch dog 144 adapted to engage a pair of front and rear latch pin members 146, 148 arranged substantially as shown. The latch dog member 144 is actuated through use of a pull cord member 150 connecting the latch dog member 144 with a manual grip member 152. The pull cord member 150 preferably extends through a hole provided in the left support frame member 108 as shown.

Turning now to FIGS. 6a–6c, an alternative embodiment of the latch dog member is illustrated in the form of a spring bias locking pin assembly 160. The assembly includes a left and right side engagement portion that are equivalently formed. The description of the left side engagement portion illustrated in FIGS. 6b and 6c is equally applicable to the right side portion.

A tapered pin 162 is supported within a cylindrical barrel member 164 which is, in turn, rigidly attached to the left elongate lip panel 66 of the roller platform member 34. The tapered pin 162 is biased as shown in FIG. 6B into an extended position by a spring member 166. A transverse pin 168 retains the tapered pin within the cylindrical barrel member against the force of the spring member.

The alternative spring biased locking pin assembly 160 is advantageous over the device 140 shown in FIGS. 2–4 in that it remains essentially hidden from view because the tapered pin member is adapted to engage stop members 170 disposed along the internal area defined by the "C" shaped rail members 44, 46.

A pair of the locking pin assemblies 160 are provided on each of the left and right sides of the roller platform member and are connected by a pull cord member 150' extending therebetween and forward to a manual grip member 152' so that the taper pins 162 may be simultaneously retracted into their corresponding cylindrical barrel members 164 to disengage the roller platform member 34 from the base frame member 32.

Figure 7:
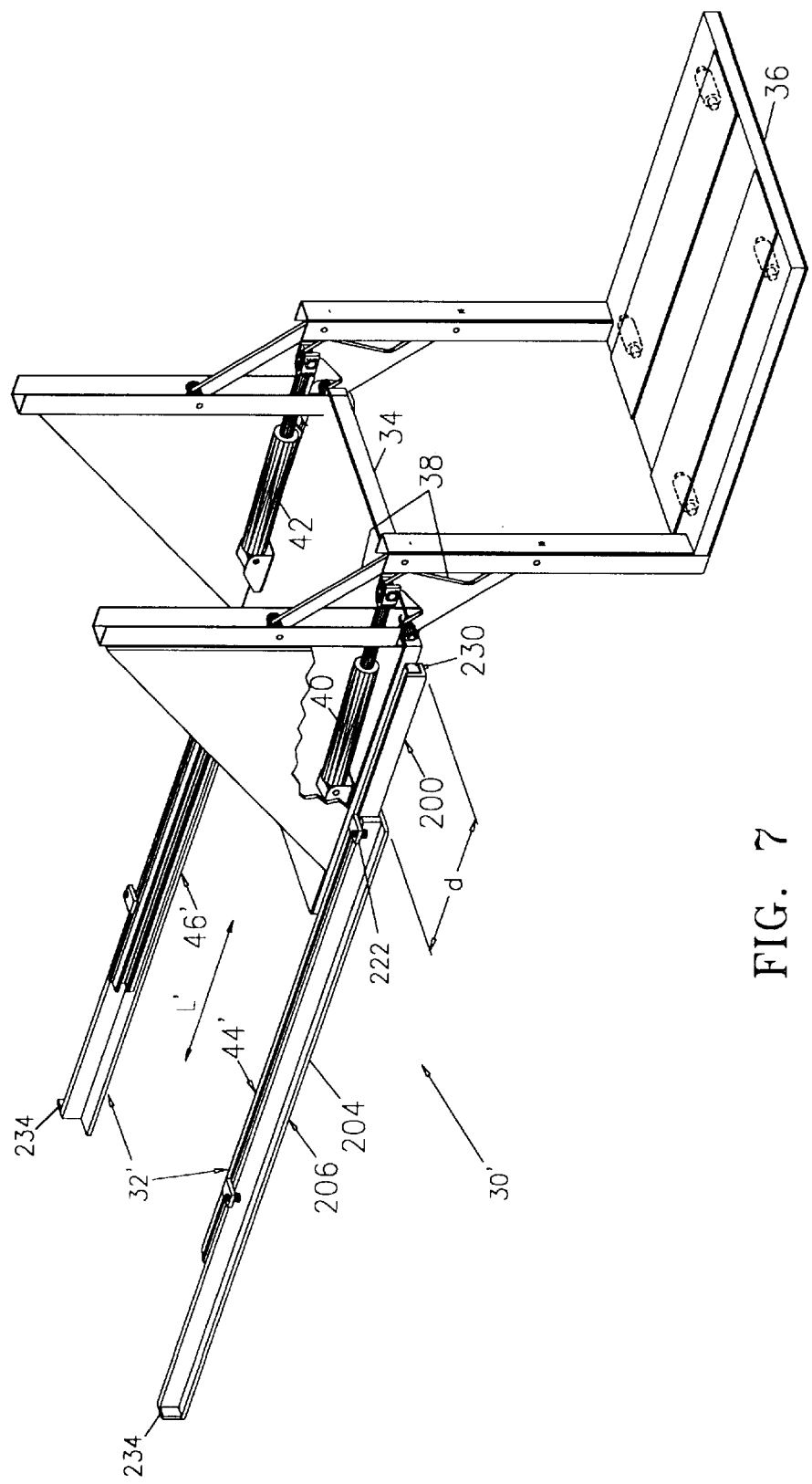
FIG. 7 is a perspective view of a slidable load lifting system in accordance with a second preferred embodiment of the present invention shown in its fully extended and lowered position.
Figure 8:
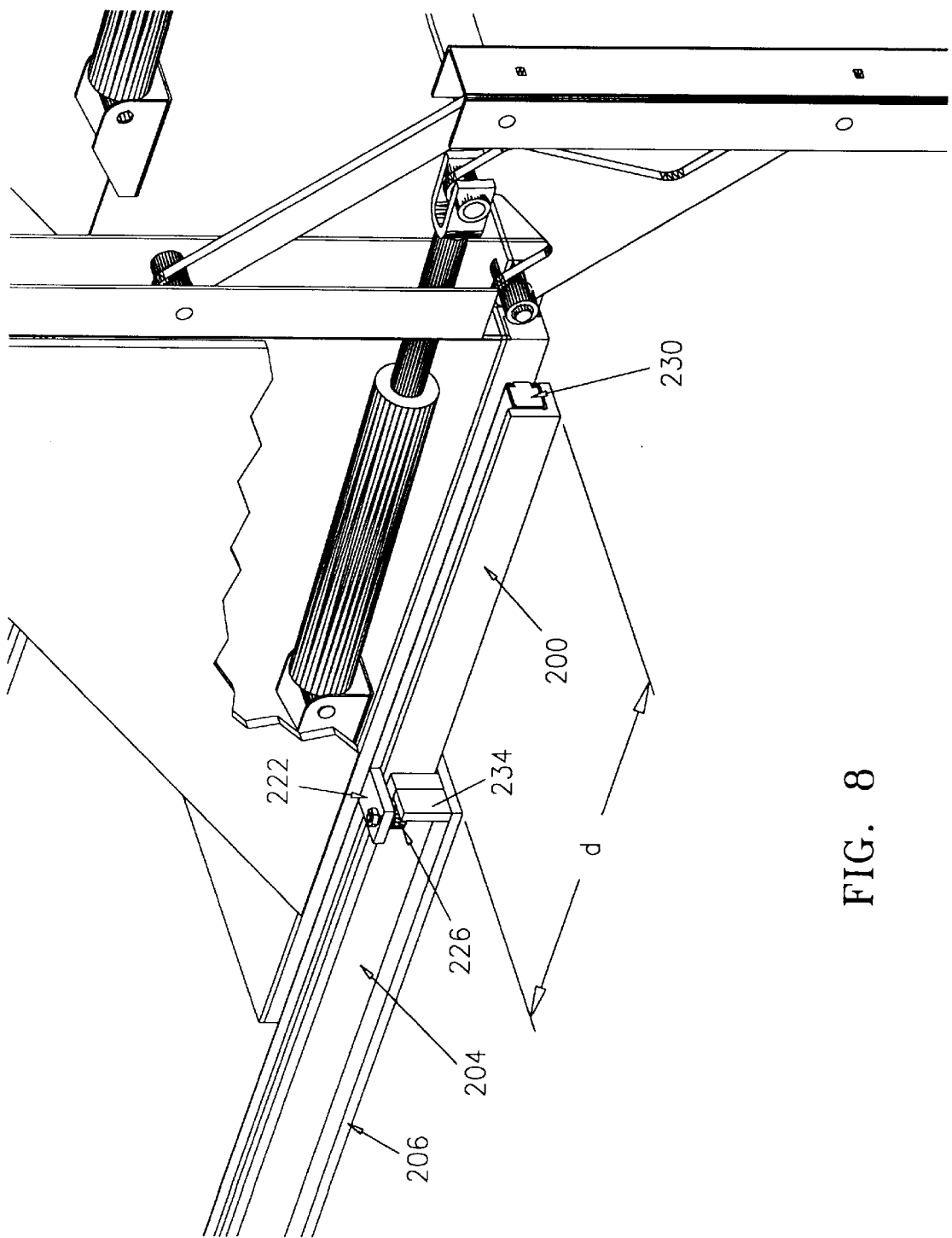
FIG. 8 is an enlarged partial perspective view of the slidable load lifting system of FIG. 7 illustrating the auxiliary extension member of the second preferred embodiment; and, FIG. 9 is a cross-sectional view of the load lifting system of FIGS. 7 and 8 taken through line 9—9 of FIG. 7.
Figure 9:
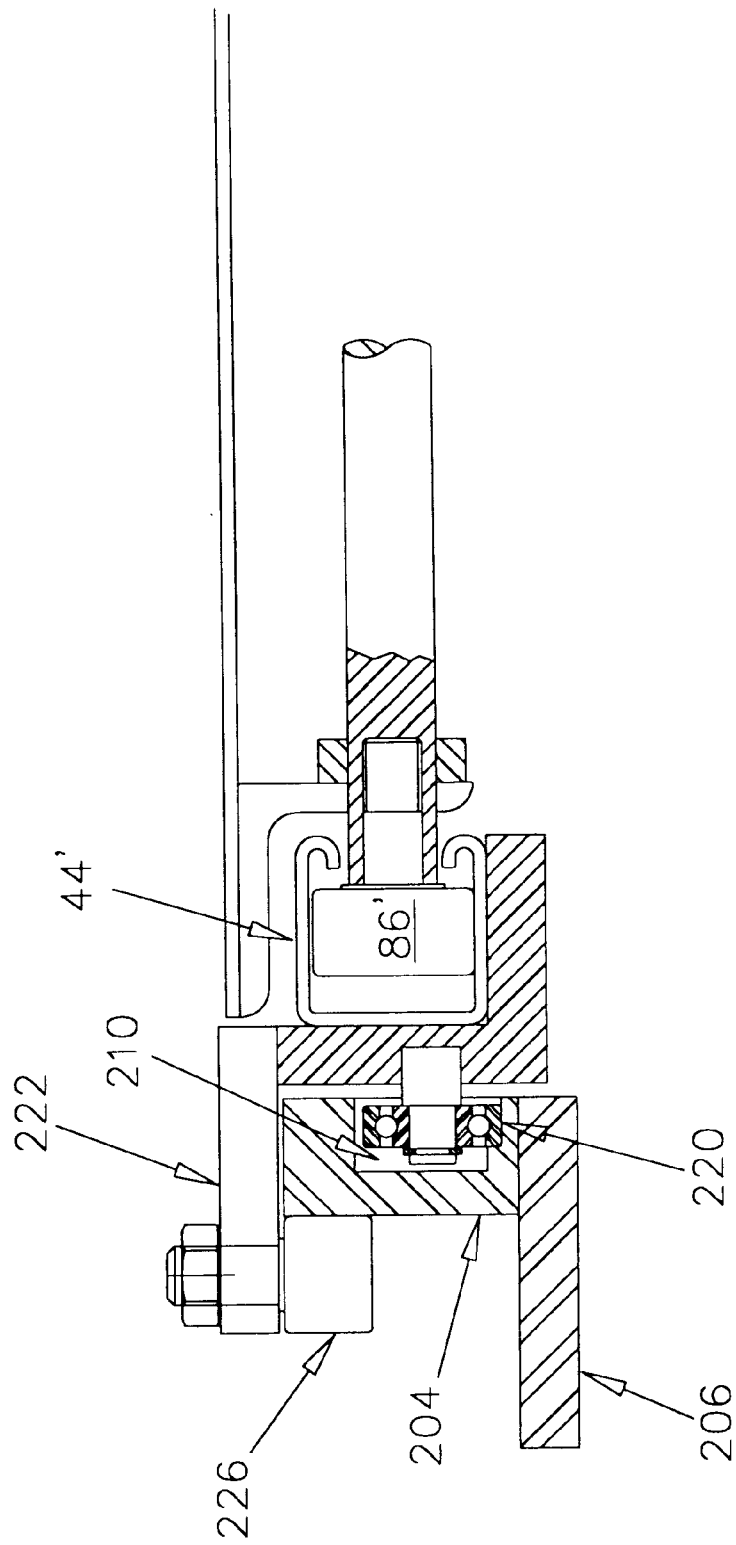

A second embodiment of the slidable load lifting system is illustrated in FIGS. 7–9. In these FIGURES, reference numerals corresponding to those previously used in the FIGS. 1–6 embodiment have been employed to designate the same or similar elements but differentiated by the addition of a prime (') suffix. Unless otherwise noted, an element so designated is to be considered as having the function and features or characteristics as described for the FIGS. 1–6 embodiment.

Turning first to FIG. 7, the major components of the load lifting system 30' according to the second preferred embodiment of the instant invention include a base frame member 32' adapted for attachment to a pickup truck bed, an auxiliary extension member 200 slidably engaged with the base frame member 32', a roller platform member 34' slidably engaged with the auxiliary extension member 200, a lift platform member 36' connected to the roller platform member 34' by a parallelogram linkage system 38', and a pair of linear actuators 40', 42'.

It is an advantage of the second preferred embodiment illustrated in FIGS. 7–9 that the roller and lift platform members 34', 36' are extendable beyond the limits of the base frame member 32' by a distance d. Preferably, the distance d corresponds to a dimension that is slightly longer than the standard height of a pickup truck tailgate so that the lift platform member 36' can be moved between its raised position (FIGS. 3 and 4) and its fully lowered position as best illustrated in FIGS. 7 and 8 with the tailgate in a horizontal opened position.

The base frame member 32' of the second preferred embodiment includes a pair of spaced apart elongate rail members 44', 46' extending substantially in parallel as illustrated and along a longitudinal axis L'. The pair of elongate rail members are substantially identically formed and, as such, a description of the left rail member 44' is applicable equally to the right rail member 46'.

Each of the elongate rail members are formed by a vertically oriented support member 202, 204 rigidly attached to a corresponding horizontally arranged base support member 206, 208. The left and right vertically oriented support members 202, 204 are each provided with an elongate guide recess 210, 212 which are arranged on the base frame member 32' so as to form a pair of spaced apart opposing grooves adapted to slidably receive a first set of wheels 220 which are connected to a pair of secondary rail members 222, 224 as illustrated. A second set of wheels 226 are also carried on the secondary rail members 222, 224 in a manner substantially as shown. The secondary rail members are further rigidly attached to a pair of elongate rail members 44', 46' which function substantially as described in connection with the first preferred embodiment illustrated in FIGS. 2–6.

During use of the slidable load lifting system 30' of the second preferred embodiment, the pair of secondary rail members 222, 224 provide an interface between the base frame member 32' and the roller platform member 34' so that the latter can be moved into a position beyond the extent of the former. The first set of wheels 220 provide slidable vertical support for the secondary rail members as they are moved between first and second positions along the longitudinal axis L' of the system. The second set of wheels 226 are oriented as shown to engage the back side vertical surface of the pair of vertically oriented support members 202, 204 to provide a horizontal guide and support to the secondary rail members 222, 224 in order to prevent the roller platform member 34' from twisting within the base frame member 32'. Suitable stop mechanisms such as a set of stop plates 230, 232 are provided on the ends of the secondary rail members as shown to prevent the roller wheels 86' carried on the roller platform member 34' from disengaging from the secondary rail members when the roller platform member is at either end of travel.

In a similar fashion, a set of end cap members 234 are provided at the four corners of the base frame member 32' to prevent the first and second sets of wheels 220, 226 from disengaging therefrom.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A load lift apparatus comprising:
   a base frame member including a pair of elongate rail members extending in parallel along a first longitudinal axis;
   a substantially planar roller platform member slidably engaged with said base frame member and defining a first plane, the roller platform member and said pair of rail members including a set of cooperating engagement elements to provide for relative slidable movement between the roller platform member and the base frame member;
   a substantially planar lift platform member movable relative to the roller member between a lowered position spaced from said roller platform member and out of said first plane for loading and unloading operatively associated items onto and off of said lift platform member, and a raised position adjacent said roller platform member and in said first plane for movement of said operatively associated items from said lift platform member directly to said roller platform member;
   a linkage system connecting the roller platform member with the lift platform member; and,
   at least one actuator member coupled to the linkage system for selectively causing relative movement between said roller platform member and said lift platform member by acting on the linkage system to move the lift platform member relative to the roller platform member between said lowered and raised positions.

2. The load lift apparatus according to claim 1 wherein said set of cooperating engagement elements include a first set of roller wheels carried on the roller platform member.

3. The load lift apparatus according to claim 2 wherein said pair of elongate rail members include a pair of spaced apart opposed "C" shaped channel members adapted to slidably receive said first set of roller wheels therebetween.

4. The load lift apparatus according to claim 1 wherein said roller platform member is slidable between:
   i) a first retracted position at a first extreme travel limit within said base frame member and along said first longitudinal axis; and,
   ii) a first extended position at second extreme travel limit within said base frame member and along said first longitudinal axis opposite said first travel limit.

5. The load lift apparatus according to claim 4 wherein said lift platform member is movable between said lowered position and said raised position only when said roller platform member is in said first extended position.

6. The load lift apparatus according to claim 5 wherein:
   in said first retracted position of said roller platform member, said lift platform member is disposed between said elongate rail members; and,
   in said first extended position of said roller platform member, said lift platform member is spaced apart from between said elongate rail members.

7. The load lift apparatus according to claim 5 wherein said lift platform member is adapted to move slidably together with said roller platform member between said first retracted position and said first extended position only when said lift platform member is in said raised position.

8. The load lift apparatus according to claim 4 further including a latch mechanism for releasably latching said roller platform member to said base frame member in at least two positions including a first position with said lift platform member in said raised position and said roller platform in said first retracted position, and a second position with said roller platform member in said first extended position.

9. A load lift apparatus comprising:
   a base frame member including a pair of elongate rail members extending in parallel along a first longitudinal axis;
   a secondary slide mechanism slidably engaged with said base frame member, the secondary slide mechanism and the base frame member including a set of first cooperating engagement elements providing relative slidable movement between the secondary slide mechanism and the base frame member;
   a substantially planar roller platform member slidably engaged with said secondary slide mechanism and defining a first plane, the roller platform member and said secondary slide mechanism including a set of second cooperating engagement elements providing relative slidable movement between the roller platform member and the secondary slide mechanism;
   a substantially planar lift platform member;
   a linkage system holding the lift platform member relative to the roller platform member so that the lift platform member is movable between a lowered position spaced from said roller platform member and out of said first plane for loading and unloading operatively associated items onto and off of said lift platform member, and a raised position adjacent said roller platform member and in said first plane for movement of said operatively associated items from said lift platform member directly to said roller platform member; and,
   at least one actuator member connected to the linkage system for selectively causing relative movement between said roller platform member and said lift platform member to move the lift platform member relative to the roller platform member between said raised and position and said lowered position.

10. The load lift apparatus according to claim 9 wherein:
    said set of first cooperating engagement elements include a first set of roller wheels carried on the secondary slide member; and,
    said set of second cooperating engagement elements include a second set of roller wheels carried on the roller platform member.

11. The load lift apparatus according to claim 10 wherein said pair of elongate rail members include a pair of spaced apart elongate members having a vertical side surface adapted to engage a first group of said first set of roller wheels and a pair of spaced apart "C" shaped elongate grooves adapted to slidably receive said second set of roller wheels therebetween.

12. The load lift apparatus according to claim 9 wherein said roller platform member is slidable between:
    i) a first retracted position at a first extreme travel limit within said base frame member and along said first longitudinal axis; and,
    ii) a first extended position at second extreme travel limit beyond the extent of said base frame member along said first longitudinal axis opposite said first travel limit.

13. The load lift apparatus according to claim 12 wherein said lift platform member is movable between said lowered position and said raised position only when said roller platform member is in said first extended position.

14. The load lift apparatus according to claim 13 wherein:
    in said first retracted position of said roller platform member, said lift platform member is disposed between said elongate rail members; and,
    in said first extended position of said roller platform member, said lift platform member is spaced apart from between said elongate rail members and at least a substantial portion of said roller platform member is spaced apart from between said elongate rail members.

15. A method of moving a load item between a first lowered position in a first plane to a second raised position in a second plane spaced apart from said first plane, the method comprising the steps of:
    providing an apparatus including:
        a base frame member disposed in said second plane, the base frame member including a pair of elongate rail members extending in parallel along a first longitudinal axis;
        a substantially planar roller platform member disposed in said second plane and slidably engaged with said base frame member;
        a substantially planar lift platform member operatively connected to said roller platform member by a linkage system, the lift platform member being movable using the linkage system between said first plane and said second plane; and,
        at least one actuator member connected to said linkage system for selectively acting on the linkage system causing relative movement between the roller platform member and the lift platform member;
    depositing said load item onto said lift platform member disposed in a one of said first plane and said second plane;
    with said actuator member, acting on said linkage system to cause relative movement between said roller platform member and said lift platform member so that said lift platform member moves between said first plane and said second plane; and,
    with said lift platform member in said second plane, moving said roller platform member and said lift platform member together within said second plane relative to said base frame member between a first retracted position whereat both said roller platform member and said lift platform member are located within a boundary in said second plane defined by a projection of said base frame member on said second plane, and a second extended position whereat said roller platform member is located within said boundary in said second plane and said lift platform member is located outside of said boundary.

16. The method according to claim 15 wherein:
    the step of depositing said load item onto said lift platform member includes depositing said load item onto said lift platform member disposed in said first plane;
    the step of causing relative movement between said roller platform member and said lift platform member includes causing relative movement between said roller platform member and said lift platform member so that said lift platform member moves from said first plane to said second plane; and,
    the step of moving said roller platform member and said lift platform member together includes moving said roller platform member and said lift platform member together within said second plane relative to said base frame member from said second extended position whereat said lift platform member is located outside said boundary to said first retracted position whereat both said roller platform member and said lift platform member are located within said boundary in said second plane.

17. The method according to claim 15 wherein:

the step of depositing said load item onto said lift platform member includes depositing said load item onto said lift platform member disposed in said second plane;

the step of causing relative movement between said roller platform member and said lift platform member includes causing relative movement between said roller platform member and said lift platform member so that said lift platform member moves from said second plane to said first plane; and, the step of moving said roller platform member and said lift platform member together includes moving said roller platform member and said lift platform member together within said second plane from said first retracted position to said second extended position.

18. The method according to claim 15 wherein the step of moving said roller platform member and said lift platform member together within said second plane includes the step of moving said roller platform member and said lift platform member together within said second plane between said second extended position and a third extended position whereat said lift platform member is located outside of said boundary and said roller platform member is at least partially located outside of said boundary.

19. The method according to claim 15 wherein the step of providing said apparatus further includes providing a secondary slide mechanism slidably engaged with said base frame member and said planar roller platform member.

20. The load lift apparatus according to claim 4 wherein said lift platform member, said at least one actuator member, and said roller platform member are adapted to move slidably together between said first retracted position and said first extended position only when said lift platform member is in said raised position.

21. The load lift apparatus according to claim 1 wherein said linkage system connecting the roller platform member with the lift platform member includes a mechanical parallelogram linkage system having an idler arm member connected between the roller platform member and the lift platform member and at least one pivotable crank arm member pivotally mounted relative to the roller platform member and connected on opposite ends to said at least one actuator member and to the lift platform member.

22. The load lift apparatus according to claim 9 wherein said linkage system connecting the roller platform member to the lift platform member includes a mechanical parallelogram linkage system having an idler arm member connected between the roller platform member and the lift platform member and at least one pivotable crank arm member pivotally mounted relative to the roller platform member and connected on opposite ends to said at least one actuator member and to the lift platform member.

23. The load lift apparatus according to claim 22 wherein said at least one actuator member includes a hydraulic cylinder connected on one end to said roller platform member and on the other end to said mechanical parallelogram linkage system.

24. The method of moving a load according to claim 15 wherein the step of providing said apparatus includes providing, as said linkage system, a parallelogram linkage system having an idler arm member connected between the roller platform member and the lift platform member and at least one pivotable crank arm member pivotally mounted relative to the roller platform member and connected on opposite ends to said at least one actuator member and to the lift platform member.

\* \* \* \* \*